United States Patent [19]

Caporali

[11] Patent Number: 4,907,146

[45] Date of Patent: Mar. 6, 1990

[54] INTERACTIVE VIDEO NETWORK BETWEEN ONE MASTER COMPUTER AND A PLURALITY OF SLAVE COMPUTERS

[75] Inventor: Giancarlo Caporali, Via D'Azeglio, 58, 40123 Bologna, Italy

[73] Assignee: Giancarlo Caporali, Bologna, Italy

[21] Appl. No.: 106,371

[22] Filed: Oct. 6, 1987

[30] Foreign Application Priority Data

Oct. 7, 1986 [IT] Italy ................................. 3536 A/86
Sep. 28, 1987 [IT] Italy ................................. 3624 A/87

[51] Int. Cl.⁴ ............................................. G09B 7/04
[52] U.S. Cl. ..................................... 364/132; 364/200; 364/230.4; 364/900; 364/920.1; 364/942.4; 434/336; 434/350
[58] Field of Search ............... 364/900, 200, 407, 409, 364/411, 131–133, 138; 434/336, 350

[56] References Cited

U.S. PATENT DOCUMENTS

| | | | |
|---|---|---|---|
| 4,609,358 | 9/1986 | Sangster | 434/336 |
| 4,715,818 | 12/1987 | Shapiro et al. | 434/350 |
| 4,759,717 | 7/1988 | Larochelle et al. | 434/336 |
| 4,764,120 | 8/1988 | Griffin et al. | 434/336 |

*Primary Examiner*—John R. Lastova
*Attorney, Agent, or Firm*—Laff, Whitesel, Conte & Saret

[57] ABSTRACT

A software-independent network which enables interconnection at video and keyboard level between one master computer and several slave computers, and is compatible with computers using either digital or analog video output. Hardware includes a master control box, and a plurality of switching circuits (one serving each slave computer) all of which are connected in cascade to the master control box by a single multicore cable; both master and slave units are interfaced with the relative computers via their standard VDU and keyboard connectors. Video images can be sent back and forth between instructor and students, the instructor can edit the screen of a student selected, or the student can edit the master screen, and a copy of the video image under scrutiny can be broadcast to all the students.

6 Claims, 9 Drawing Sheets

INTERACTIVE VIDEO NETWORK BETWEEN ONE MASTER COMPUTER AND A PLURALITY OF SLAVE COMPUTERS

BACKGROUND of the INVENTION

The invention relates to an interactive network between one master computer and a plurality of slave computers, wherein the master computer comprises a master CPU, keyboard and VDU, and the each slave computer likewise, a relative CPU, keyboard and VDU. The prior art embraces a software independent device for connecting one master computer to a plurality of slaves, which is employed for teaching purposes; such a device comprises a master unit for the master computer, and as many slave units are required for the number of slave computers in use.

The master unit incorporates as many selector keys as may be needed to match the number of slave units connected to it, plus two video function keys, one of which used to call in copies of the students' screens, the other to broadcast a copy of the master screen to the students.

Each slave unit is provided with a mode key that enables contact with the master unit, and connects with the master unit by way of an individual cable; accordingly, the number of cables leaving the master will correspond to the number of slave units.

The instructor, using the master computer, can inspect the video image of any one of the students' slave computers, simply by depressing the first of the two special function keys together with the number key allocated for that slave station.

Depressing the second special function key, the instructor allows the students to see a copy of his/her own screen; this key simply enables the master-to-slave transmission line, though it is the student who must effectively access the master screen by depressing the appropriate key.

A device of this type is therefore substantially a passive visual system, pure and simple, and allows no interaction between the keyboards of the various computers. Moreover, a direct link-up needs to be established between each slave and the master, and a centralized system of connections is required.

An additional drawback of this device is its limited expandability, inasmuch as master units are designed for a given number of slaves, and purchased as such; thus, a decision to increase the number of slaves at a future time necessarily involves nothing less than replacement of the entire master unit with one of wider capability.

Accordingly, the object of the invention is that of overcoming the drawbacks mentioned above.

SUMMARY of the INVENTION

The stated object is achieved in full with an interactive network as disclosed and claimed herein, which is designed to connect one master computer with a plurality of slave computers and permit of interaction between any one keyboard and any other computer, whilst remaining software-independent and sparing users of the slave computers the operation of local and remote switching.

A first advantage of the invention is that it offers performance features which are not obtainable with software controlled networks, namely, lower cost, hardware embodied separate from the computer, operation using special controls independent of the keyboard, while permitting retention of the cascade structure typical of software operated networks.

A further advantage of the network according to the invention is that when used as a teaching aid, for instance, it enables the instructor to conduct a genuine examination and correction dialogue on the student's work. Both the examination and correction functions in question can be made either private, by limiting the video image to the single student and the instructor, or public, by relaying it to all of the remaining students, again, with no requirement for additional software or special connections to the CPU logic circuitry.

Another advantage of the invention stems from having the master control box and slave switching circuits interconnected in cascade using a single multicore cable: manufacture and installation are simplified, and the slave stations can be expanded at will to any number, without any limitation being imposed by the capacity of the control box.

Notwithstanding the slave switching circuits are connected in cascade and powered by the respective computers, according to the invention, only the slave computers actually in use need remain switched on; this is an economy achieved by running only the slaves nearest, in sequence, to the master control box, though the option also exists of supplying power independently to each slave unit, at random, if so desired.

According to the invention, one overcomes the problem of providing a low cost device giving video connection between a master computer and a plurality of slaves where the video signal may be digital or analog, monochrome or color, RGB or composite.

Furthermore, the device in question allows of immediate adaptation to at least two different makes and classes of personal computer: IBM PC, XT and AT, OLIVETTI M19, M24 and M28, and the new IBM PS/2, models 30, 50, 60 and 80, as well as of potential adaptation to all such computers as use digital-TTL or analog video connection.

With the system disclosed, control and selection are made both simple and rational in the extreme for the instructor inasmuch as switching can be effected either by operating two search buttons, or using a direct selection keyboard provided with a specific key for each student.

The network according to the invention can be expanded at will, simply by reproportioning the capacity of the numeric selection facility to suit requirements, by virtue of the fact that there is just one multicore bus cable running out from the master control box.

BRIEF DESCRIPTION of the DRAWINGS

The invention will now be described in detail, by way of example, with the aid of the accompanying drawings, in which.

DESCRIPTION of the PREFERRED EMBODIMENTS

It may be stated at the outset that the systems most widely adopted in connecting VDU and CPU use standard RGB-TTL or standard RGB analog, or again, composite analog.

In the case of standard RGB-TTL, connection can be effected using multicore screened cable having at least as many conductors as are required for single components of the video image, plus two conductors for synchronizing purposes.

For color, these components will comprise at least vertical and horizontal synchronization, red, green and blue. This is the system adopted for PCs having digital video output, and is the system for which the hardware of FIGS. 1 . . . 6 is designed.

The type of connection most widely adopted for a PC keyboard remote from the CPU, on the other hand, is screened cable with at least two wires, one of which carrying the synchronizing pulses, the other serving for data transmission in serial mode.

The network disclosed is embodied with this type of connection in mind.

An interactive system according to the invention permits of connecting a master computer, comprising a central processing unit UEo, video display unit Vo and keyboard To, with a plurality of slave computers each of which having a relative central processing unit CPU, denoted UE1 . . . UEi UEj, UEn, video display unit, denoted V1 . . . Vi, Vj, Vn and keyboard, denoted T1 . . . Ti, Tj, Tn; slave components are denoted 'j' when considered generically, and 'i' when selected interactively.

Figures 1, 2:
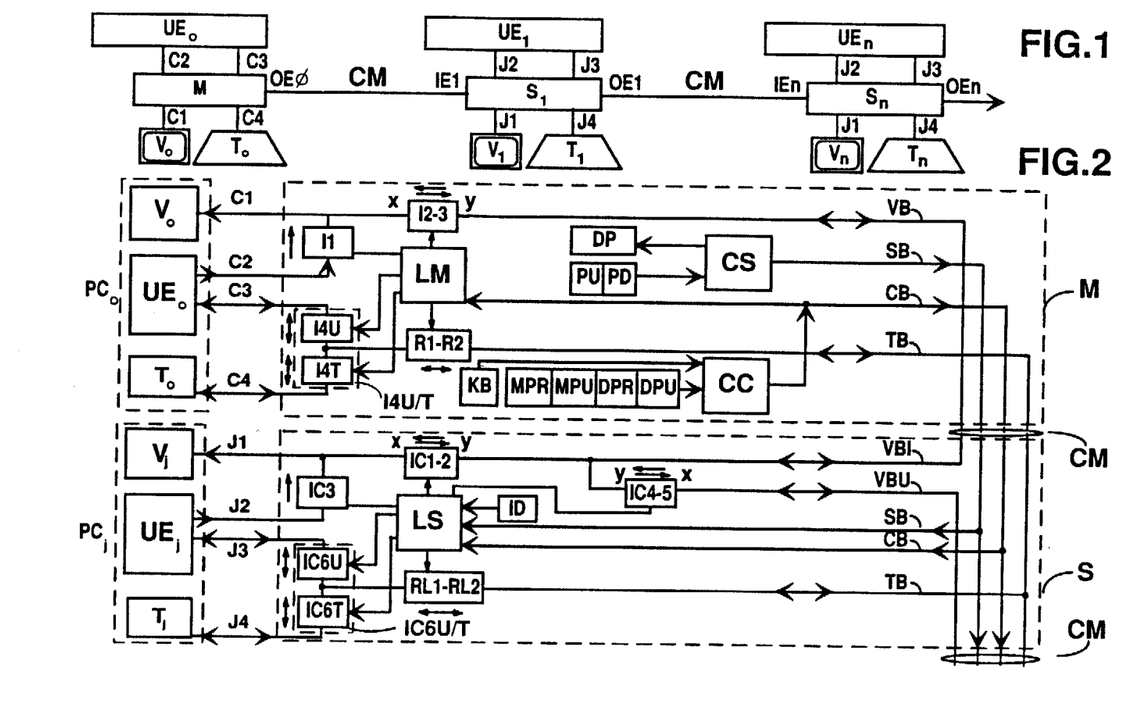
FIG. 1 is a block diagram which illustrates the basic configuration of the device.
FIG. 2 is a block diagram of the master control box and one slave switching circuit forming part of the hardware as embodied for use with computers using digital video output.

With reference in particular to FIGS. 1 and 2, the device disclosed comprises a master control box M linked up to the master computer and connected in cascade with a plurality of switching circuits S1 . . . Si, Sn, each of which linked up to a relative slave computer. Such a cascade connection is achieved to advantage utilizing a single multicore cable CM. Link-up of the master control box M to the master computer is effected such, that the master CPU UEo is interconnected through the control box with the master VDU Vo by way of leads C1 and C2, and with the master keyboard To by way of leads C3 and C4. Thus, the control box M can make or interrupt the connection between leads C1 and C2 and between C3 and C4 by way of its own logic network LM, which is fully independent in operation, and also assigns a keyboard bus TB structured in such a way as to allow interactive connection of the master keyboard To with any one of the slave CPUs UEl . . . UEi, UEn, and similarly, of the master CPU UEo with any one of the slave keyboards T1 . . . Ti, Tn.

More exactly, the master control box M comprises a selector unit CS by means of which any one of the slave computers can be accessed through a dedicated bus SB, and a control unit CC and relative control bus CB, which, in conjunction with a set of buttons KB, DPR, DPU, MPR and MPU, controls the interactive keyboard and video functions channelled respectively through the keyboard bus TB aforementioned, and a video bus VB; the instructions from the control unit CC are also relayed to the master logic network LM for coordination purposes.

The button markings correspond thus:

DPR—display private: a copy of the master screen is broadcast to the selected student only;

DPU—display public: a copy of the master screen is broadcast to all students;

MPR—monitor private: a copy of the selected slave screen (student) is viewed by the instructor only;

MPU—monitor public: a copy of the selected slave screen is viewed by all the other students, as well as by the instructor;

KB—keyboard: activated together with DPR or DPU, enables editing of the master screen by the selected student; together with MPU or MPR, enables editing of the selected student's screen by the instructor.

With a configuration such as this, illustrated by way purely of example, five buttons are used to effect all the interactive functions of the network; to permit reduction of the number of buttons from five to four, the public/private function could be allocated to a single button, in which case the four markings would then become M (monitor), D (display), PR/PU (private/public) and KB (keyboard).

Another possible five-function combination would be M, MKB, D, DKB, PR/PU, enabling the instructor to oversee the student's work and correct it (M—MKB), to address and question the student (D—DKB), and to render the four interchanges private or public (PR/PU).

A further combination of the 4 video functions could be produced with eight keys -viz, four purely visual functions, and the same four functions with keyboard interaction enabled, thus: MPR, MPU, DPR, DPU, MPRKB, MPUKB, DPRKB, DPUKB.

Both the video bus VB and the keyboard bus TB are subject to the master logic network LM, which in turn is piloted by the instruction signals received through the control bus CB. All the buses mentioned thus far, VB, TB, CB and SB are routed through the multicore cable CM. Where control and selection data are transmitted in serial mode, CB and SB may be integrated into a single bus consisting in at least one conductor.

In order to allow interactive connection between keyboards, transmission can be broken or restored by the master logic network LM, both at the leads C3 and C4 between the CPU UEo and the keyboard To, and through the keyboard bus TB, commuting both the data and the synchronization signals together.

Each switching circuit S likewise incorporates an independent logic network LS that is piloted by the control and selection buses CB and SB and is able similarly to interrupt and restore transmission of the data and synchronization signal through the keyboard bus TB, thereby completing the interactive facility.

The slave logic network LS is also provided with an electromechanical device ID serving to allocate an initial identity number that corresponds to the code system adopted at the selector unit CS; thus, the slave identification code supplied via the relative bus SB is compared by the logic network LS with the number programmed into the device ID.

Comparison having been effected by two specific integrated circuits IC8 and IC9, type 74 LS 85 in the case in point, the logic network LS will produce the appropriate output control signal according to whether the identification code received happens to be greater, less or equal to that allocated, and on the basis of the type of function that is received through the control bus CB.

Each switching circuit S comprises a multiple switch device IC1-2, controlled by the logic network LS, which is located between the video bus VBI and the relative slave VDU and CPU and serves to effect the connection between these two slave components and the video bus.

The master logic network LM controls a first multiple switch device 11 located between the master CPU UEo and master VDU Vo, and a second multiple switch device 14U-T located between the master CPU and keyboard UEo and To. R1 and R2 denote a pair of conventional relays controlling the keyboard bus TB.

In similar fashion, the logic network LS of each slave switching circuits also controls corresponding first and second multiple switch devices, denoted IC3 and IC6U-T respectively, and the video bus TB is controlled by pair of relays RL1 and RL2.

Where a considerable number of slave computers may be in use and the quality of the image is not to be compromised, the video signal transmitted in each direction will require conditioning to ensure that no distortion occurs, and that its strength remains unimpaired throughout the length of the bus; this is achieved by incorporation of an electronic device IC4-5 into each switching circuit, located between the video input and output buses VBI and VBU and controlled by the relative logic network LS. More precisely, each such electronic device will comprise at least two drivers "d" connected in antiparallel and capable of three states (see FIG. 3). With this method, each slave logic network LS will operate in such a way that the relative electronic device IC4-5 directs or inhibits the video signal as appropriate.

Figure 3:
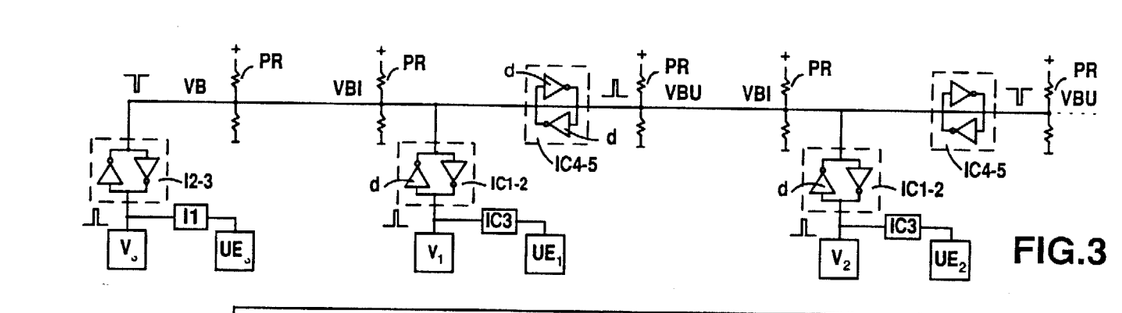
FIG. 3 shows a basic circuit of the digital video connection between the master control box and the slave switching circuits, considered in isolation from the logic networks.

In order to attenuate reflection of the signal that passes through the inputs of each device IC4-5 in either direction (another cause contributing to poor video quality) one also has resistance dividers PR located upstream and downstream of the single device IC4-5. A divider could also be located on the video bus VB from the master control box M. In order to enhance video performance even further, the drivers making up each electronic device IC4-5 will be inverting components, in order to produce a logic inversion of the signal between one computer and the next in the cascade, in either direction.

With such a system, loss in quality of the image is attenuated, in comparison to the loss that would inevitably occur without such safeguards, inasmuch as any given defect would be multiplied were the number of slave computers in use to be increased. Accordingly, each multiple switch device IC1-2 also consists in a pair of drivers "d" connected in antiparallel, inverting for one switching circuit and non-inverting for the next circuit up- or downstream in the cascade, and so on in alternation (FIG. 3).

In the example illustrated, where I2-3 denotes a switch device (likewise with two drivers) located on the master video bus, it will be observed that the multiple switch device IC1-2 serving the first slave in line is inverting, whereas that serving the next slave in line is non-inverting. In the event of the device denoted I2-3 being considered unnecessary and dispensed with, the configurations of IC1-2 for the first and second slaves would be reversed.

DP denotes a luminous display, associated with the selector unit CS, on which the identity number of the selected slave computer appears, and PU and PD denote two buttons that are depressed to select a higher or lower identity number, respectively.

More exactly, the selector unit CS comprises a pulse generator GI, operated by the two buttons PU and PD (the number is raised or lowered simply by depressing and holding the relative button), and a counter I7, which is connected by way of a decoder driver I9 to the display DP, as well as to at least one output driver I8 from which the selection bus SB departs.

The control unit CC is structured such that the keyboard function button KB is connected direct to an input conductor of the master logic network LM and to a conductor of the relative control bus CB. The other function buttons (all video) are wired, similarly, each to an input of the logic network LM and to the bus CB, though compounded with a string of series-wired switches which correspond to the remaining video functions; these will all deactivate upon activation of the one button selected. Such an arrangement, clearly illustrated in FIG. 5, must be adopted in order to avoid the selection of more than one video function at a time. For instance, it will be evident that when video button MPU is activated, the relative conductor will become active and all other video buttons will be deactivated, whilst the one remaining button KB (keyboard) stays unaffected. At all events, it is possible to achieve the end in question by using buttons wired up to a logic module such as will produce the appropriate output signals.

The multiple switch devices denoted I1 and IC3 would be embodied to advantage using an integrated circuit type 74 LS 244, whilst those denoted I4U-T and IC6U-T would each consist in an integrated CMOS 4066.

As regards the logic controlling operation of the entire network, master and slave logic networks LM and LS might consist in wired logic circuitry, or in microprocessors, in particular microcontrollers, e.g. COP manufactured by the National Semiconductor Corporation, which also comprise a serial line that allows of transmitting selection and control signals through just the one wire: in this instance, blocks LM, CS and CC (FIG. 2) would be fused into a single component -i.e. one COP.

Figure 4:
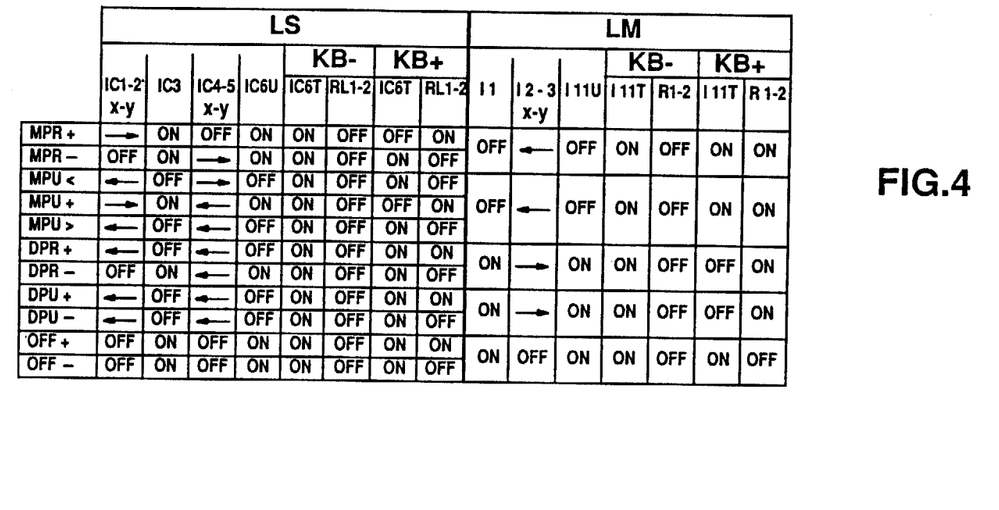
FIG. 4 shows the logic tables adopted in designing the logic networks of the master control box (LM) and the single slave switching circuit (LS), as illustrated in FIG. 2.

Structuring and operation of the logic networks will be discernable from the table of FIG. 4.

The columns in the table indicate the direction of conduction (arrows) or the active or disactive state (ON OFF) of the various switching components, relays and electronic switches mentioned above. Each horizontal line indicates an instruction given by the control unit CC via the respective button, and sent through the bus CB to the switching circuits S; "+" denotes the switching circuit Si effectively selected, whereas "−" denotes a switching circuit S in the non-selected state. "<" denotes the switching circuits S located between the master control box M and the switching circuit Si selected; ">" denotes those located downstream of the selected circuit Si. The two bottom lines OFF+ and OFF− denote the state of the selected Si and the non-selected circuits S, respectively, when none of the control buttons are depressed. The columns denoted KB− show conditions when the keyboard control is inactive, whilst those denoted KB+ illustrate conditions with the button depressed. The eight columns of the left hand block show the state of all the various devices dependent upon and controlled by the switching circuit logic network LS, whereas the seven columns of the right hand block show the state of those devices dependent upon and controlled by the master logic network LM. The arrows denoting direction of conduction of the various devices are oriented in accordance with the diagram of FIG. 2, in conjunction with the x−y−z references.

To take an example, let it be supposed that the MPR button at the master control box is depressed. The resultant state of the various devices relative to the selected switching circuit Si is shown in the first line of the table, whereas the state of those relative to the non-selected circuits S is shown in the second line; a full explanation of the various conditions is given further on in the specification, in connection with the table of FIG. 10.

Briefly then, the network as a whole has four basic operating configurations:
video function button DPR depressed: a copy of the master video screen Vo is broadcast exclusively to Vi, the VDU of the slave selected, and can be edited using either the master keyboard To, in which case the function button KB must remain inactive, or the selected slave keyboard Ti, in which case KB must be depressed:
video function button DPU depressed: a copy of the master video screen Vo is broadcast to all the slave VDUs, and can be edited utilizing either the master keyboard To (function button KB inactive), or the selected slave keyboard Ti (KB depressed);
video function button MPR depressed: a copy of the slave screen selected Vi appears on the master VDU Vo, and can be edited utilizing either the relative slave keyboard Ti, in which case the function button KB must remain inactive, or the master keyboard To, in which case KB must be depressed;
video function button MPU depressed: a copy of the slave screen selected Vi appears on the master VDU Vo and on all of the remaining slave VDUs, and can be edited using either the relative slave keyboard Ti, (function button KB inactive), or the master keyboard To, (KB depressed).

Figure 5:
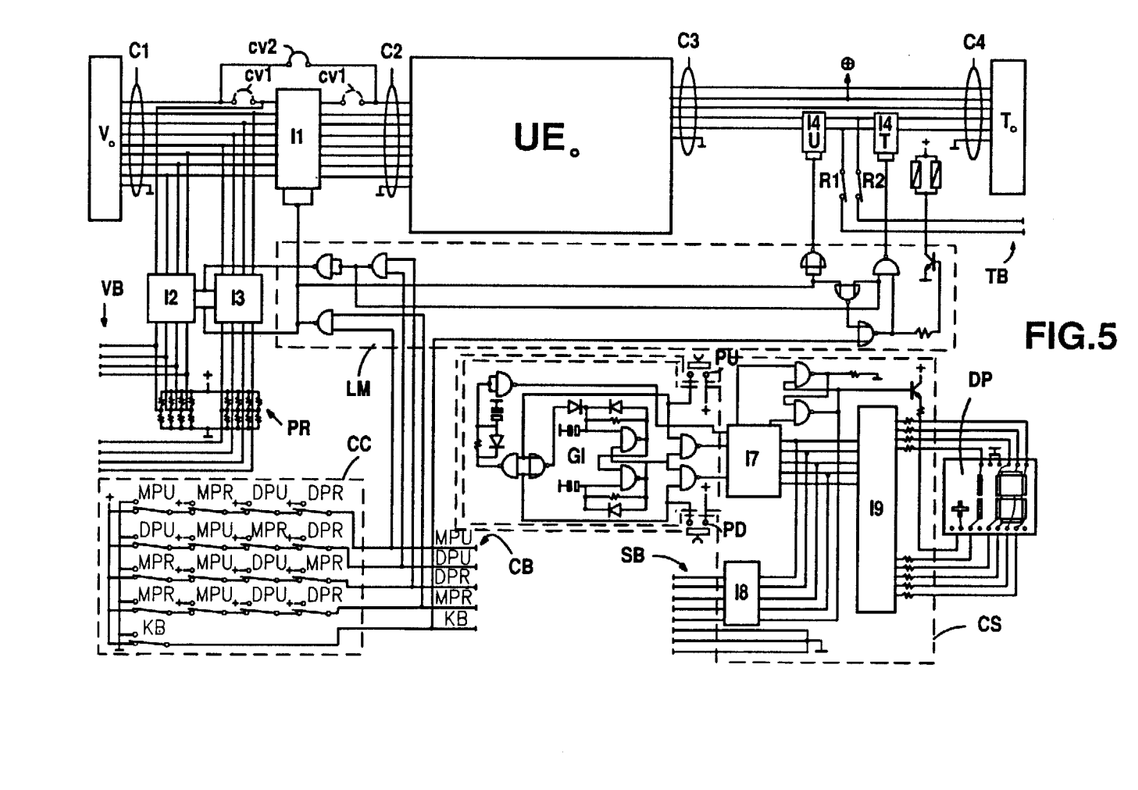
FIGS. 5 and 6 show circuit diagrams of the master control box and one slave switching circuit, as in the preceding drawings.

Observing FIG. 5 and the illustration of the master control box M, it will be observed that the conductors of leads C1, C2, C3 and C4 are permutated in each case in so as to match the pin allocations of connectors as utilized for IBM or OLIVETTI PCs. More precisely, in the event of the network being adapted for use in conjunction with an OLIVETTI monochrome or color VDU, the modification is made at jumpers cv1 and cv2: for monochrome, the two jumpers denoted cv1 can be discarded, whereas cv2 must be inserted; for color, the two cv1s must be inserted, and cv2 removed.

Figure 6:
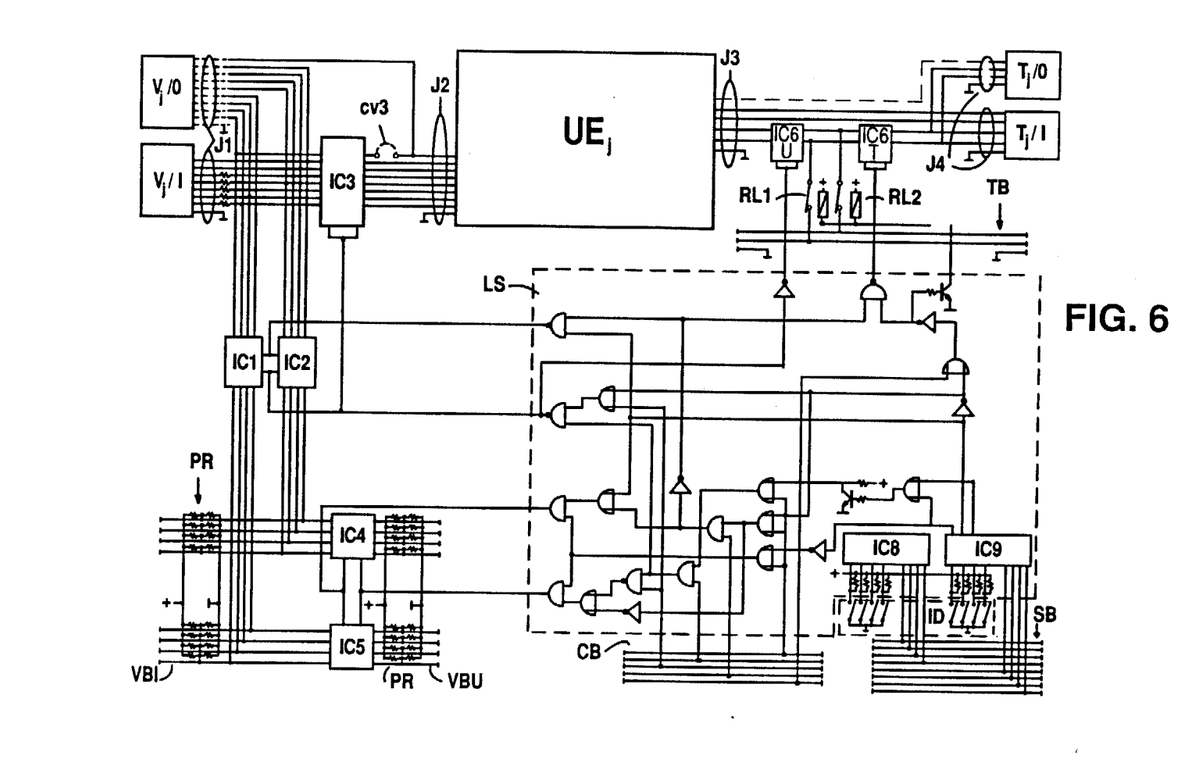

In FIG. 6, which illustrates the slave switching circuit, conversion from IBM to OLIVETTI is effected by substituting the respective VDU connectors (Vj/0 denotes the connection for IBM personal computers, and Vj/I that for OLIVETTI).

The jumper denoted cv3 must be inserted for OLIVETTI color VDUs.

Still referring to FIG. 6, a similar adaptation must be effected for the keyboard; Tj/1 denotes IBM, and Tj/0 denotes OLIVETTI.

Before moving on to the embodiment of FIGS. 7 through 12, which refers to computers utilizing an analog video output, it should be observed that when speaking of an RGB signal (red-green-blue), one is referring to a signal comprising three distinct color signals, plus synchronizing signals, which for analog mode requires three coaxial leads for the color, and at least one wire for synchronization purposes. Where the signal is "composite", on the other hand, the entire bundle of signals can be transmitted through a signal coax lead, although the image produced is of poorer quality. The composite signal occurs as a particular form of RGB signal in which there are no synchronizing components, and only one color.

The monochrome signal occurs as a particular form of RGB, in which one color only is active.

Even where the color signals are analog, the two synchronizing signals, vertical and horizontal, can still be digital, and as such, handled by the system as illustrated in FIGS. 1 through 6, or by a simplified version of that illustrated in FIGS. 7 through 12, in which the two synchronizing signals are simply branched into the bus in straightforward fashion.

Figure 7:
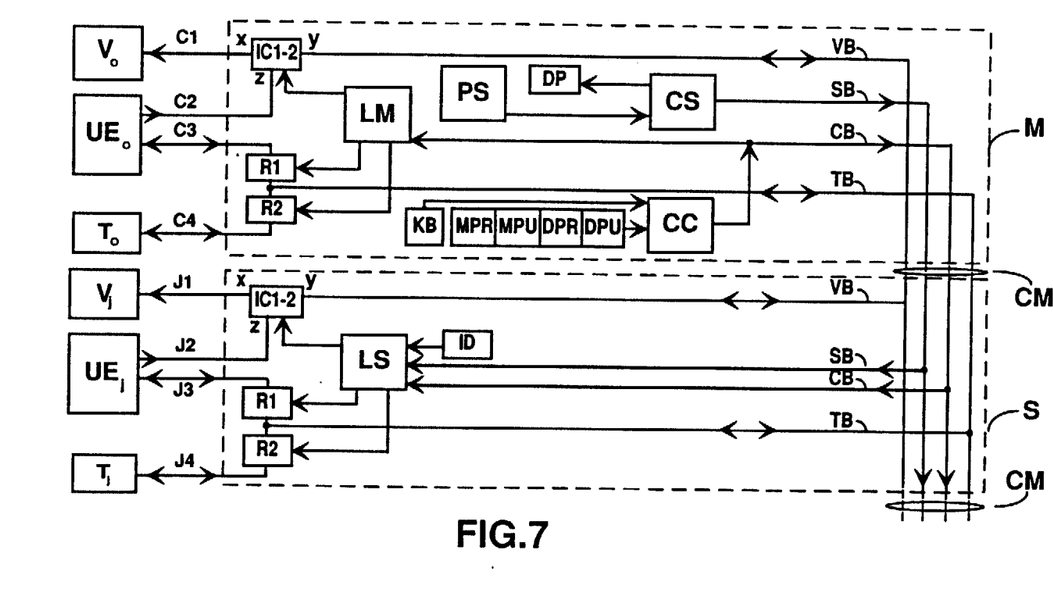
FIG. 7 is a block diagram of the master control box and one slave switching circuit forming part of the hardware as embodied for use with computers using analog video output.

To permit of relaying the analog video signal from a given CPU UE to the relative VDU V and to the video bus VB, or viceversa, from bus to VDU, the master control box M and each switching circuit S incorporates a multiple switch device IC1-2 which is controlled by the relative logic network LM or LS, and located between the video bus VB and each VDU and relative CPU, thus constituting the connection between these and the bus VB.

Figures 8, 9:
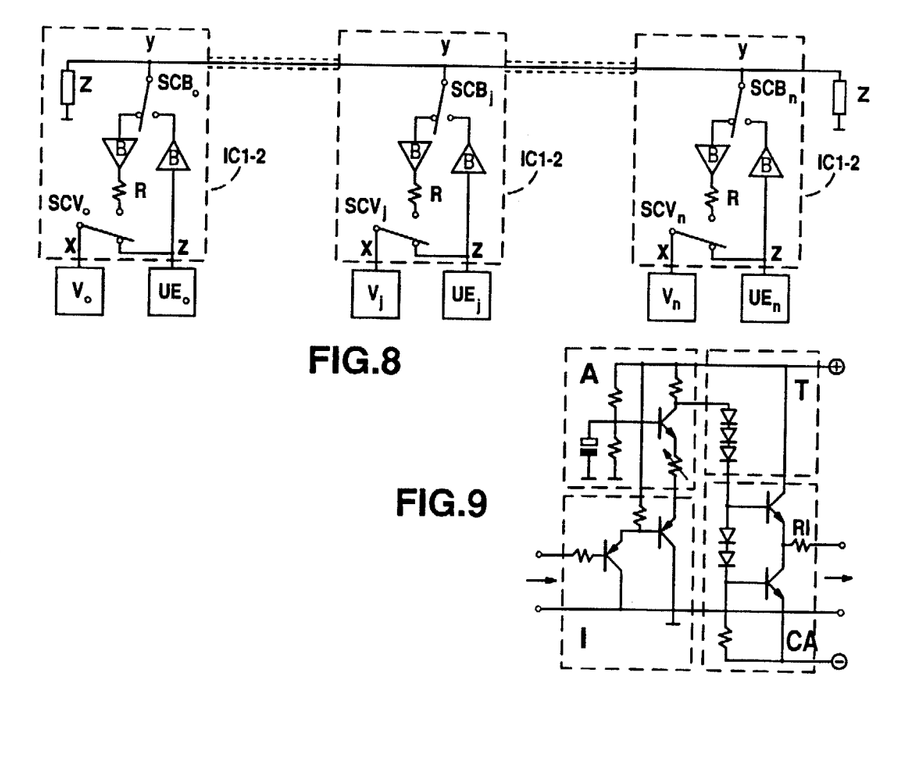
FIG. 8 shows a basic circuit of the analog video connection beteen the master control box and the slave switching circuits, considered in isolation from the logic networks.
FIG. 9 shows a circuit diagram of one of the buffer modules (B) illustrated in FIG. 8.

The particular embodiment of this multiple switch device reflects an original feature of the invention disclosed, and is best described departing from the general principle illustrated in FIG. 8.

In designing hardware for transmission of an analog video signal, it is particularly important that source, coax cable and load should all be of the same impedance, otherwise standing waves and variations in amplitude will occur in the signal, the effect of which is to produce an unacceptable deterioration in quality of the image transmitted.

Where continuity of the coax cable is broken in order to take the signal off and direct it toward a second load, considerable imbalance will occur in the network, and whilst this defect can be avoided by wiring in divider-impedor circuitry, the signal nevertheless must become weaker by a given margin.

Where a notable number of such interruptions in continuity are made, then the source must put out a signal of far greater amplitude than that required effectively by the final load, due to the reduction that occurs at each of the intermediate loads; what is more, the amplitude of the signal taken off at intermediate points will differ in each case, and potentiometers are needed to maintain a constant level throughout.

Again, with a distribution system structured in this way, the signal must always depart from exactly the same point, namely, the source end, otherwise the intermediate potentiometer settings will need to be modified each time the position of the source on the cable is altered. The result is that a video signal cannot be relayed from a random point along the coax transmission line, whether intermediate or terminal; to allow such a facility, the video signal must be of constant amplitude throughout the line, and the line itself balanced in such a way that no resetting is necessary.

One of the objects of the invention is exactly that of realizing these two conditions, to the end of enabling connection in cascade utilizing a single multicore cable.

The system is illustrated in FIG. 8, which shows a master station, an intermediate slave station and the final slave station; all contacts are in the at-rest position, with the three stations isolated from the video bus and operating in local mode. For any station to receive from or transmit through the video bus, all that is required is a "make", at SCV or SCB, respectively.

Supposing it is the intermediate CPU UEj that is to transmit, it will be noted straight away that UEj supplies a video signal to the relative VDU, Vj, and accordingly, a further load cannot be connected without affecting the quality of the image at Vj.

B denotes a buffer module absorbing virtually zero current at its input and capable of reproducing the signal at its output, which is connected to a load represented by the two branches of the video bus (right and left) whenever the relative contact SCBj moves from the at-rest position (that of FIG. 8) to that enabling transmission. At this point, one realizes the objective of obtaining a video signal throughout the line without upsetting the signal transmitted from UEj to Vj.

Now, by installing two terminal impedances Z at the extreme ends of the cascade, one permanently incorporated into the master control box M, and the other plugged into the line output from the final slave unit Sn, the two branches of the bus will be properly matched for the end in view: standing waves nil, and a signal of regular amplitude right through the line. Such a condition is obtainable, however, only as long as load registering at the inputs of the buffer modules B is characterized by virtually zero absorption.

If, at this point, the output of each buffer module B is wired to an external resistance R such as matches its output impedance to that of the video input, all that is required in order to broadcast a copy of the image at Vj to the other screens Vo and Vn, is that the relative contacts SCVo and SCVn be switched from the local mode position (see FIG. 8) to that enabling reception from the bus, whereupon the one image will appear faultlessly reproduced on all VDUs connected to the system Vo ... Vj ... Vn.

A buffer module B of the type described above has been put together, and is illustrated in FIG. 9; the combined end it is sought to achieve is one of ultra-generous bandwidth coupled with ultra-high input impedance, and at low manufacturing cost. The buffer module B disclosed consists substantially in four distinct blocks, connected in series thus:

first block, denoted 1: voltage follower consisting in a cascade of two transistors connected in common-collector configuration, designed to boost the ultra weak absorbed input current to an output level such as will pilot the next stage;

second block, denoted A: voltage amplifier designed to supply an output signal of approximately double the input amplitude in order to compensate for the halved signal strength which occurs downstream as a result of matching impedance to an external load; comprises one common-collector connected transistor;

third block, denoted T: level compensator utilizing three series-connected diodes, by which the offset voltage in the signal from the amplifier block A is nullified;

fourth block, denoted CA: a symmetrical current amplifier comprising two transistors, designed to prevent subjection of the voltage amplifier block A to loading, and an internal resistance RI wired in series with the output, serving to match the output impedance to the external load.

Thus, the invention ensures great economy in terms both of the buffer module's low cost, and of the fact that its inclusion admits of exploiting cascade connection of the slave computers using a single bus cable, irrespective of which computer transmits, and of whether reception is private or public.

It will be seen in FIG. 7 that the selector unit CS pilots a display DP giving visual indication of the identity number of the slave computer selected, and is operated by a button console comprising as many buttons as there are slave computers to be numbered. More particularly, the selector unit CS comprises a keyboard encoder IP (FIG. 11) by which the number of the selected slave unit is relayed through a driver decoder IS to the display DP; the number is also relayed direct to at least one driver IB which supplies the output signal to the selection bus SB.

In addition to the switch device denoted IC1-2, the master logic network LM also pilots second and third multiple switch devices R1 and R2 wired so as to cut directly into the lines connecting the master CPU and keyboard, UEo and To, and the keyboard bus TB.

In like manner, the logic network LS of each of the switching circuits Sj also controls second and third multiple switch devices R1 and R2.

A comparison having been made by a conventional integrated circuit IMC (FIG. 12), the logic network LS will emit the appropriate output control signal according to whether the station identity number matches or differs from the number allocated, and on the basis of the type of function sent through the control bus CB.

Figure 11:
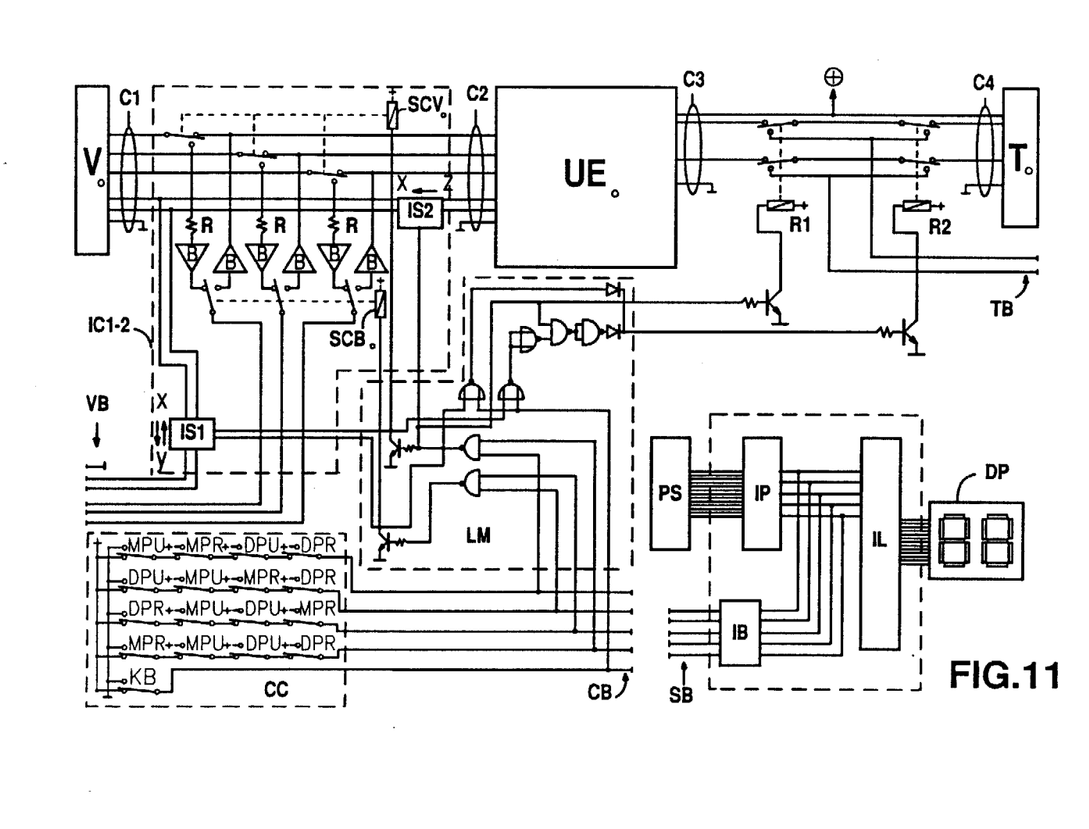
FIGS. 11 and 12 show circuit diagrams of the master control box and one slave switching circuit as in FIGS. 7 and 10, respectively.

FIG. 11 also shows the multiple switch devices IS1, IS2 which handle the two digital synchronizing signals (see above); these would be TTL integrated circuits type 74 LS 125 in the case in point.

Figure 10:
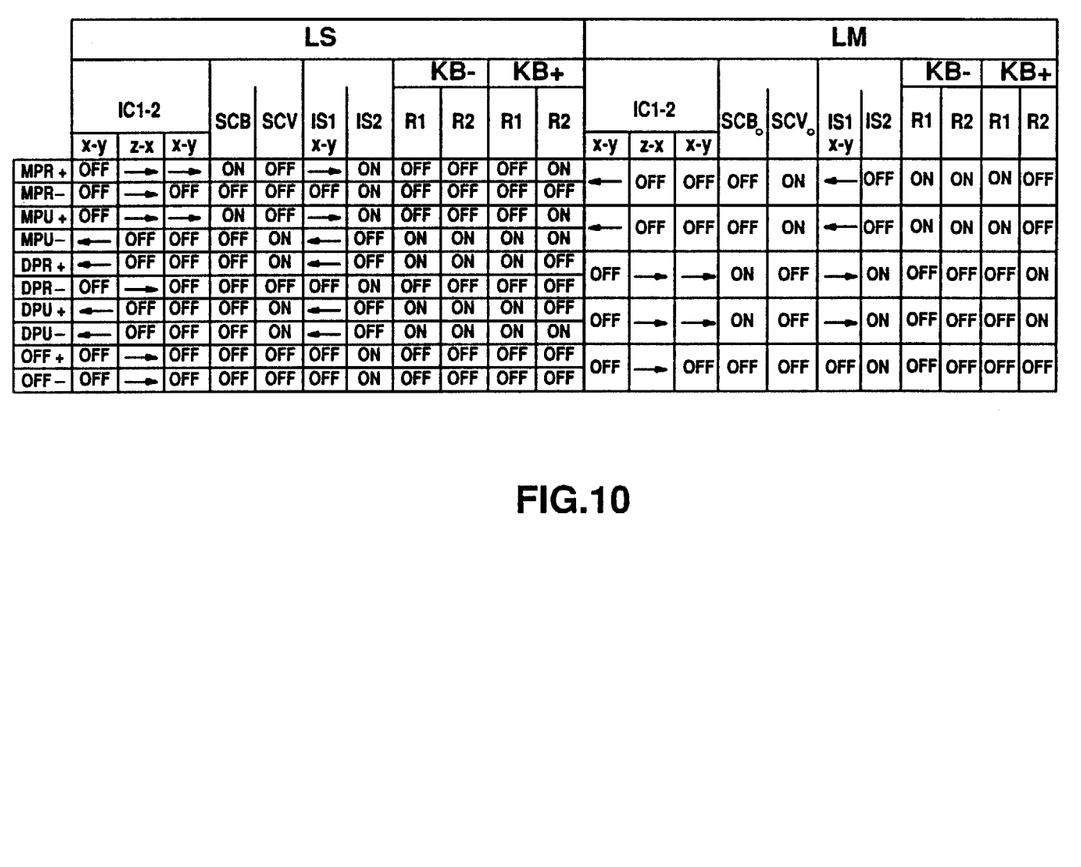
FIG. 10 shows the logic tables adopted in designing the logic networks of the master control box and single slave switching circuit illustrated in FIG. 7.

Structuring and operation of the logic networks LS and LM are discernable from the table of FIG. 10.

The columns in the table indicate the direction of conduction (arrows) or the active or disactive state (ON OFF) of the various switching components, relays and electronic switches described above.

In the case of the SCB and SCV contacts, ON and OFF denote the excited and disexcited state of the relay; the "OFF" state (disexcited) is that shown in the drawings.

Each horizontal line indicates an instruction given via the control unit CC using the respective button, and transmitted through the bus CB to the switching circuits S; "+" denotes the switching circuit Si effectively selected, whilst "—" denotes a switching circuit S in the non-selected state. The two bottom lines OFF+ and OFF— denote the respective states of the selected and the non-selected circuit, Si and S, and that of the control box M, when all the control buttons are inactive. Columns denoted KB- indicate conditions when the keyboard control is inactive, whilst those denoted KB+ show conditions with the button depressed.

The eleven columns of the left hand block show the state of the various devices dependent upon and controlled by the switching circuit logic network LS, whereas the eleven columns of the right hand block show the state of devices dependent upon and controlled by the master logic network LM.

Figure 12:
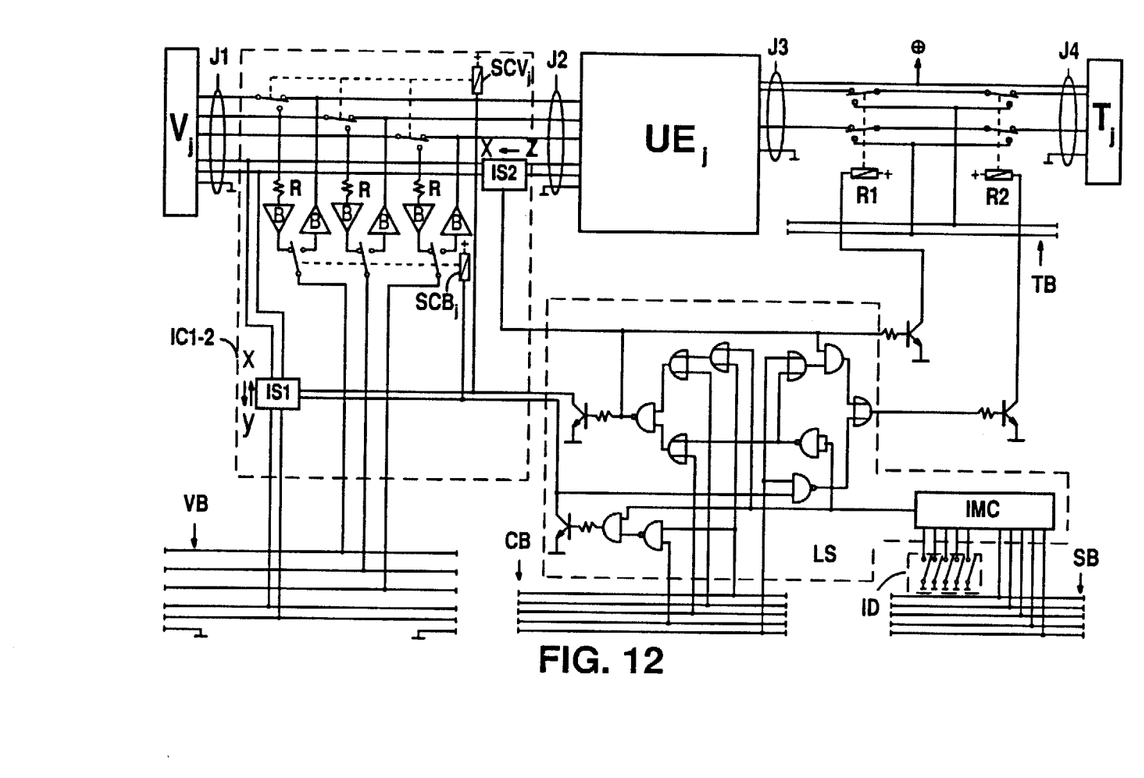

Arrows denoting the direction of conduction of the various devices are oriented in accordance with the diagram of FIG. 7 and used in conjunction with letter references x - y - z, which also appear in FIGS. 8, 11 and 12 for maximum clarity.

To take an example, let it be supposed that the MPR button at the master control box is depressed.

The corresponding state of the various devices relative to the selected switching circuit Si is shown in the first line of the table, whereas the state of those relative to the non-selected circuits S is shown in the second line.

It will be seen from the first line that IC1-2 conducts from z to x -i.e. from UEi to Vi, and from z to y -i.e. UEi to bus VB; accordingly, the video image currently generated by the selected slave computer continues to appear on the relative slave VDU, as well as being transmitted through the bus (SCBj excited, SCVj disexcited).

Similarly, in the case of the synchronizing signals, the first line across shows IS1 conducting from x to y, hence from Vj to the bus VB, whilst IS2 is shown conducting from z to x (the only direction permissible), hence from UEj to Vj, in such a way that the digital video synchronizing signals follow the analog video data signals.

Again, the first line indicates relays R1 and R2 (see FIG. 12) in the disexcited state, such that keyboard Ti remains connected to UEi, the relative CPU; when button KB is depressed, on the other hand, relay R2 will excite and switch the slave CPU from keyboard Ti to master keyboard To, thereby enabling the instructor to edit the student screen selected, a copy of which appears on the master screen as a result of the MPR function being activated.

The second line (MPR-) indicates that all the slave computers apart from the one selected remain isolated from the network; it will be observed, in fact, that this line and the bottom line of the LS block are identical, indicating all function buttons inactive. The states of the various devices relative to the master logic network LM are described in the line continuing to the right from the first two lines of the LS table, and in the case illustrated, IC1-2 conducts from y to x -i.e. bus VB to master VDU Vo, whereas the connection between z and x is broken (SCVo excited, SCBo disexcited) in order to avoid superimposition of the signals emitted by the master CPU UEo and the video bus VB; for the same reason, IS1 conducts from y to x, and IS2 remains off.

Relays R1 and R2 are both excited, isolating the master keyboard To so as to protect UEo, which in the configuration in question is separated from the master VDU (SCVo excited).

Activating the keyboard function KB, on the other hand, relay R2 will disexcite, connecting the master keyboard To with the bus TB, hence with the UEi (the slave unit selected) so that the instructor can edit the student's screen.

What is claimed is:

1. An interactive video network between one teacher computer and a plurality of student computers for enabling an interconnection at video and keyboard levels between said teacher computer and said student computers, said network comprising a teacher processor, a teacher keyboard and a teacher monitor, and a plurality of student computers, each of said student computers comprising a student processor, a student keyboard and a student monitor, said teacher monitor and said teacher keyboard being coupled into said network by plugging cords and said teacher processor having first and second teacher processor ports, said student monitor and said student keyboard being coupled into said network by plugging cords and said student processor having first and second student processor ports;

at least one master interface unit and a plurality of slave interface units, said master interface unit comprising a plurality of switching devices which are able to interrupt or to restore transmission of video and keyboard signals between the computers, said computers being interconnected in cascade via a single main cable; said master interface unit having an output port connected to said main cable and being linked to the teacher monitor and to the teacher keyboard by means of master ports at the master interface unit and being connected to said monitor and to said keyboard respectively by means of a teacher video cord and a teacher keyboard cord; the master interface unit being linked to said teacher processor by first and second plugging cords and said first and second teacher processor ports; said master interface unit being capable of interrupting and restoring connections between the teacher monitor, the teacher keyboard, the teacher processor, and the main cable in order to inhibit or enable transmission of both video and keyboard signals between the teacher and the student computers;

said master interface unit comprising a selector device for selecting one only of the plurality of student computers and for transmitting address instructions over said main cable to select said one student computer;

a master logic means which is independent of the teacher processor;

a controller unit for said master logic means, said controller unit transmitting selected operation mode instructions to both said master logic means and said main cable;

a set of operation mode keys which control said controller unit and select a preselected video and keyboard mode of operations;

said master logic means operating said switching devices in order to interrupt and restore connections between said teacher monitor, teacher keyboard, teacher processor and said main cable; said master logic means also operating said switching device in order to enable a transmission of video and keyboard signals, respectively, through a video bus and a keyboard bus associated with the main cable; said master logic means also operating said switching device in order to provide preselected video modes by which a video image on the teacher monitor screen can be transmitted to either a selected one student monitor or to all of the student monitors, and, likewise, by which a video image on a selected student monitor screen can be transmitted to either only the teacher monitor or to both the teacher monitor and all other non-selected student monitors, and means for preselecting keyboard modes by which it becomes possible to either retain a connection between each keyboard and its associated processor for local typing, or to establish a connection to a selected student keyboard and to the teacher processor while disconnecting the teacher keyboard, or to connect the teacher keyboard to a selected student processor while disconnecting the associated student keyboard, whereby remote typing may be provided in order to enable the selected student to type through his keyboard onto the teacher monitor, or to enable the teacher to type through his keyboard onto the selected student monitor;

each of said plurality of slave interface units, being connected in cascade to the master interface unit via said single main cable, and having an input port connected to the master interface unit output port by the said main cable and having an output port connected to the slave interface units which follow in the cascade, each of the slave interface units being linked to an associated student monitor and student keyboard by means of plug-in student video and keyboard cords respectively plugged into video and keyboard ports at the student interface unit, each slave interface unit being linked to said student processor by first and second video and keyboard cords coupled between the slave interface unit and said first and second video and keyboard ports of the corresponding student processor; each of said slave interface unit having means for interrupting and restoring connections between both the monitor and the keyboard of each student computer and a connection to the associated student processor, and connections between said student monitor, student keyboard, student processor and the main cable in order to enable a transmission of both video and keyboard signals between the student computer, the teacher computer, and all remaining student computers;

each of said slave interface unit comprising at least an identity address circuit connected to a slave logic operator to provide a predetermined address information for comparison with address information received from the selector device of the master interface unit;

a slave logic operator controlled by said identity address circuit and via the control bus, said slave logic operator operating switch devices to interrupt and restore connections between the student monitor, the student keyboard, the student processor and the main cable;

said slave logic operator operating switching devices in order to enable a transmission of both video and keyboard signals, respectively, via said main cable, said signals being transmitted between the student computer and the main cable in order to provide preselected video and keyboard modes;

a first multiple switch device controlled by said master logic means and coupled between the main cable and said teacher monitor, said first multiple switch device being capable of interrupting and restoring connections to the teacher monitor;

a second multiple switch device, controlled by said slave logic operator, and coupled between the main cable and a corresponding student monitor, said second multiple switch device being capable of interrupting and restoring connections to the corresponding student monitor;

a third multiple switch device for directly controlling connections between the master processor and the master monitor;

a fourth multiple switch device coupled to give direct control over connections between the master keyboard and the master processor;

a fifth multiple switch device giving direct control over connections between said fourth multiple switch device and the keyboard bus;

a sixth multiple switch device giving direct control over connections between the student processor and the student monitor;

a seventh multiple switch device giving direct control over connections between the student keyboard and the student processor; and an eighth switch device giving direct control over connections between said seventh multiple switch device and the keyboard bus.

2. The interactive video network of claim 1, wherein the controller assigns video modes by activation of appropriate ones of the keys, and means for remotely editing according to whether or not a remote keyboard operation mode key is activated or left unactive during remote video operation.

3. The interactive video network of claim 1, wherein the master and slave logic operators comprise microprocessors.

4. The interactive video network of claim 1, wherein the master and slave logic operators comprise wired logic circuitry.

5. The interactive video network of claim 1, wherein said second multiple switch device is coupled directly into the video bus and comprises at least one buffer module for each video signal component, said second multiple switch device having an input with a high impedance in order to absorb minimal current from a signal supply line and having an output impedance which is matched to a load in order to produce a signal which is identical in amplitude and with a strength which is sufficient to drive said load.

6. Device as in claim 1, wherein each slave interface unit incorporates an electronic device, located between video bus input output ports, controlled by the relative slave logic operator, and comprising at least two 3-state drivers connected in antiparallel, which are designed to condition video signal transmitted in either direction, thereby eliminating distortion and maintaining strength unaltered throughout the downstream length of the video bus, and to convey or block video signal in accordance with instructions received from the relative slave logic operator.

* * * * *